US011486820B2

(12) United States Patent
Cai et al.

(10) Patent No.: US 11,486,820 B2
(45) Date of Patent: Nov. 1, 2022

(54) CHEMICAL SENSOR AND METHOD OF FORMING THE SAME

(71) Applicant: Agency for Science, Technology and Research, Singapore (SG)

(72) Inventors: Hong Cai, Singapore (SG); Jifang Tao, Singapore (SG); Lennon Yao Ting Lee, Singapore (SG); Alex Yuandong Gu, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 420 days.

(21) Appl. No.: 16/649,448

(22) PCT Filed: Oct. 8, 2018

(86) PCT No.: PCT/SG2018/050508
§ 371 (c)(1),
(2) Date: Mar. 20, 2020

(87) PCT Pub. No.: WO2019/074442
PCT Pub. Date: Apr. 18, 2019

(65) Prior Publication Data
US 2020/0278289 A1    Sep. 3, 2020

(30) Foreign Application Priority Data

Oct. 12, 2017  (SG) ............................ 10201708437Y (51) Int. Cl.
*G01N 21/35* (2014.01)
*G01N 21/77* (2006.01)
*G01N 21/3504* (2014.01)

(52) U.S. Cl.
CPC ..... *G01N 21/3504* (2013.01); *G01N 21/7746* (2013.01)

(58) Field of Classification Search
CPC ........... G01N 21/3504; G01N 21/3577; G01N 21/7703; G01N 21/7746
See application file for complete search history.

(56) References Cited

U.S. PATENT DOCUMENTS 5,747,808 A    5/1998   Wong
6,124,145 A    9/2000   Stemme et al.
(Continued)

FOREIGN PATENT DOCUMENTS

CN    103776793 A    5/2014
JP    2012-220352 A    11/2012
(Continued)

OTHER PUBLICATIONS

International Search Report for International Application No. PCT/SG2018/050508 dated Nov. 29, 2018, pp. 1-4.
(Continued)

*Primary Examiner* — Mark R Gaworecki
(74) *Attorney, Agent, or Firm* — Shackelford, Bowen, McKinley & Norton, LLP (57) ABSTRACT

Various embodiments may relate a chemical sensor. The chemical sensor may include a substrate including a first sealed (or isolated) cavity and a second sealed (or isolated) cavity separate from the first sealed (or isolated) cavity. The chemical sensor may also include an emitter in the first sealed (or isolated) cavity, the emitter configured to emit infrared light. The chemical sensor may further include a detector in the second sealed (or isolated) cavity. The chemical sensor may also include a waveguide configured to carry the infrared light from the emitter to the detector. The waveguide may include a sensing portion configured such that a property of the infrared light carried through the sensing portion changes in response to a chemical entity in contact with the sensing portion. The detector may be
(Continued)

configured to detect the change in the property (of the infrared light).

11 Claims, 6 Drawing Sheets

(56) References Cited

U.S. PATENT DOCUMENTS

| | | | |
|---|---|---|---|
| 8,896,834 B2 | 11/2014 | Lin et al. | |
| 2009/0039266 A1* | 2/2009 | Arno | G01J 5/0014 |
| | | | 250/343 |
| 2013/0258345 A1 | 10/2013 | Lin et al. | |
| 2014/0061677 A1 | 3/2014 | Jakoby et al. | |
| 2014/0097343 A1 | 4/2014 | Gidon et al. | |

FOREIGN PATENT DOCUMENTS

| | | |
|---|---|---|
| WO | 2013167874 A1 | 11/2013 |
| WO | 2018106193 A1 | 6/2018 |

OTHER PUBLICATIONS

Written Opinion of the International Searching Authority for International Application No. PCT/SG2018/050508 dated Nov. 29, 2018, pp. 1-7.
Kanan et al., "Semiconducting Metal Oxide Based Sensors for Selective Gas Pollutant Detection," Sensors, vol. 9, No. 10, 2009, pp. 8158-8196.
Liu et al., "A Survey on Gas Sensing Technology," Sensors, vol. 12, 2012, pp. 9635-9665.
Wikipedia, "Absorption Spectroscopy," https://en.wikipedia.org/wiki/Absorption_spectroscopy, 2018, pp. 1-8.
Jurgen Kasberger, "An Integrated IR-Sensor for Vibrational IR-Spectroscopy," Proceedings GMe Forum 2011, Proceedings of the Seminar at the Vienna University of Technology, Apr. 14 and 15, 2011, pp. 17-24.
De Graaf et al., "Design and Fabrication Steps for a MEMS-based Infrared Spectrometer Using Evanescent Wave Sensing," Sensors and Actuators A, vol. 142, 2008, pp. 211-216.
Chowdhury et al., "MEMS Infrared Emitter and Detector for Capnography Applications," Procedia Engineering, vol. 168, 2016, pp. 1204-1207.

* cited by examiner

FIG. 3 provide or form a substrate including a first sealed cavity and a second sealed cavity separate from the first sealed cavity ⟶ 302 provide or form an emitter in the first sealed cavity, the emitter configured to emit infrared light ⟶ 304 provide or form a detector in the second sealed cavity ⟶ 306 form a waveguide configured to carry the infrared light from the emitter to the detector ⟶ 308

FIG. 6

CHEMICAL SENSOR AND METHOD OF FORMING THE SAME

CROSS-REFERENCE TO RELATED APPLICATION

This application claims the benefit of priority of Singapore application No. 10201708437Y filed Oct. 12, 2017, the contents of it being hereby incorporated by reference in its entirety for all purposes.

TECHNICAL FIELD

Various aspects of this disclosure relate to a chemical sensor. Various aspects of this disclosure relate to a method of forming a chemical sensor.

BACKGROUND

Gas sensing technologies have been developed for decades, with various methods allowing sensing of volatile gas with high sensitivity and selectivity. One method is based on the precise measurements of spectral finger prints of a gas using an optical system, e.g. using terahertz (THz) time-domain spectroscopy. However, such a method may have limited applications due to the bulky and complex system required. In fact, over the past decades, there has been an increasing demand for developing low-cost solution, small and reliable gas sensors, due to their wide applications in areas such as indoor-air quality (IAQ) monitoring, and applications in food storage, agriculture, medical diagnosis, and industrial waste.

Figure 1A:
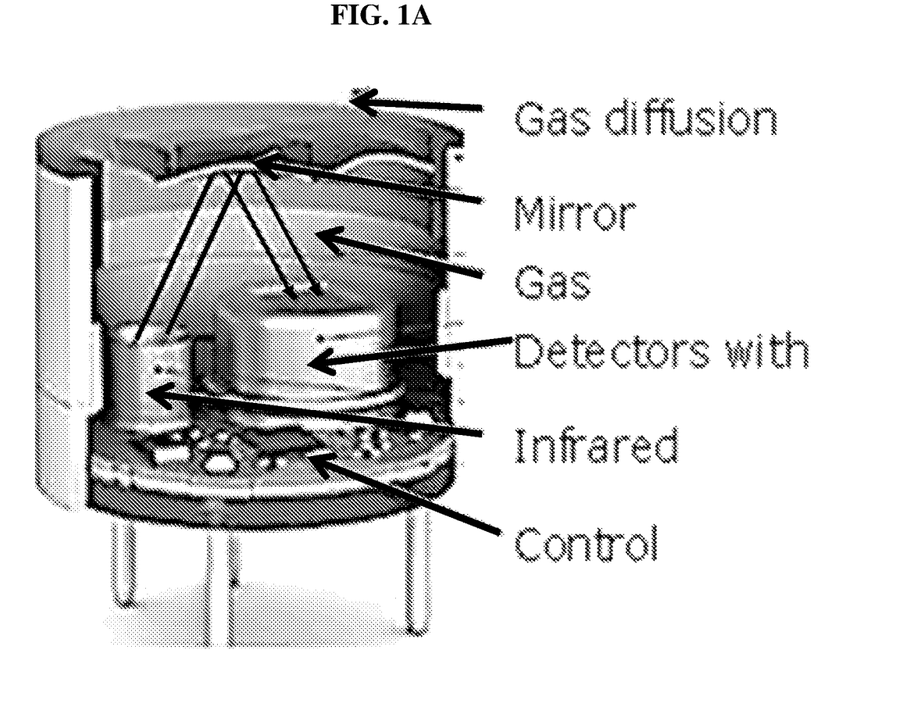
FIG. 1A is a schematic of a conventional nondispersive infrared (NDIR) gas sensor.
Figure 1B:
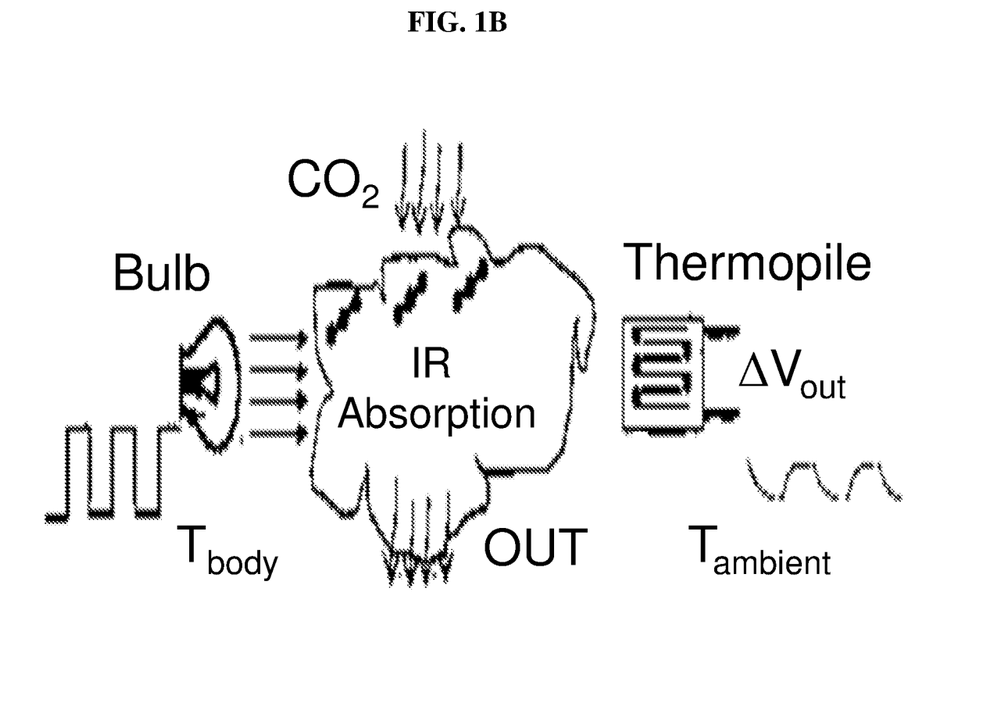
FIG. 1B is a schematic illustrating the working principle of the nondispersive infrared (NDIR) gas sensor.

On the other hand, most current miniaturized and low-cost commercial gas sensors are based on metal oxide semiconductors (e.g. zinc oxide (ZnO) etc.), which suffer some intrinsic limitations including sensitivity drift, short life time, and cross-response in multi-gas sensing. Indeed, a more powerful solution—absorption spectroscopy based nondispersive infrared (NDIR) gas sensor, shows superior performance, such as reduction in cross-response in multi-gas environment, high sensitivity, small drift, and long life time (up to 10 years). FIG. 1A is a schematic of a conventional nondispersive infrared (NDIR) gas sensor. FIG. 1B is a schematic illustrating the working principle of the non-dispersive infrared (NDIR) gas sensor. As shown in FIG. 1B, a light source such as a bulb generates infrared waves. The infrared waves pass through the chemical entity to be measured, in this case carbon dioxide ($CO_2$) gas, which absorb a portion of the infrared waves. A detector, such as a thermopile, is used to detect the amount of infrared waves absorbed by the carbon dioxide gas.

Conventional NDIR gas sensors need post-fabrication packaging and complex optical assembling processes, which may result in high costs and which may lead to cumbersome sizes.

There have been previous attempts to reduce sensor size by using wafer-level integration to fabricate light source, reaction chamber and light detector onto a single wafer. However, as a consequence of the resulting complicated optical structure, the coupling efficiency may be low, meaning a high power infrared (IR) source may be required.

Additionally, a concept of a fully integrated IR gas sensor has also been previously proposed. Although such a design can be scaled down to millimeter scale, difficulties with low optical coupling efficiency and weak sensing evanescent light are hard to overcome. Furthermore, a few critical fabrication processes in forming the sensor, including processes to form the low loss photonics waveguide and the light source, as well as the integration processes of the detection system are challenging.

SUMMARY

Various embodiments may relate a chemical sensor. The chemical sensor may include a substrate including a first sealed (or isolated) cavity and a second sealed (or isolated) cavity separate from the first sealed (or isolated) cavity. The chemical sensor may also include an emitter in the first sealed (or isolated) cavity, the emitter configured to emit infrared light. The chemical sensor may further include a detector in the second sealed (or isolated) cavity. The chemical sensor may also include a waveguide configured to carry the infrared light from the emitter to the detector. The waveguide may include a sensing portion configured such that a property of the infrared light carried through the sensing portion changes in response to a chemical entity in contact with the sensing portion. The detector may be configured to detect the change in the property (of the infrared light).

Various embodiments may relate to a method of forming a chemical sensor. The method may include providing or forming a substrate including a first sealed (or isolated) cavity and a second sealed (or isolated) cavity separate from the first sealed (or isolated) cavity. The method may also include providing or forming an emitter in the first sealed (or isolated) cavity, the emitter configured to emit infrared light. The method may further include providing a detector in the second sealed (or isolated) cavity. The method may additionally include forming a waveguide configured to carry the infrared light from the emitter to the detector. The waveguide may include a sensing portion configured such that a property of the infrared light carried through the sensing portion changes in response to a chemical in contact with the sensing portion. The detector may be configured to detect the change in the property (of the infrared light).

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the methods or sensors are analogously valid for the other methods or sensors. Similarly, embodiments described in the context of a method are analogously valid for a sensor, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may also be used herein to mean that the deposited material may be formed "indirectly on" the implied side or surface with one or more additional layers being arranged between the implied side or surface and the deposited material. In other words, a first layer "over" a second layer may refer to the first layer directly on the second layer, or that the first layer and the second layer are separated by one or more intervening layers. Further, in the current context, a layer "over" or "on" a side or surface may not necessarily mean that the layer is above a side or surface. A layer "on" a side or surface may mean that the layer is formed in direct contact with the side or surface, and a layer "over" a side or surface may mean that the layer is formed in direct contact with the side or surface or may be separated from the side or surface by one or more intervening layers.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Various embodiments may seek to address one or more of the abovementioned issues. Various embodiments may relate to a chemical sensor with high selectivity and/or low performance drift upon aging. Various embodiments enjoy lower costs, and/or may be of a smaller size compared to conventional chemical sensor. Various embodiments may have high coupling efficiency.

Figure 2:
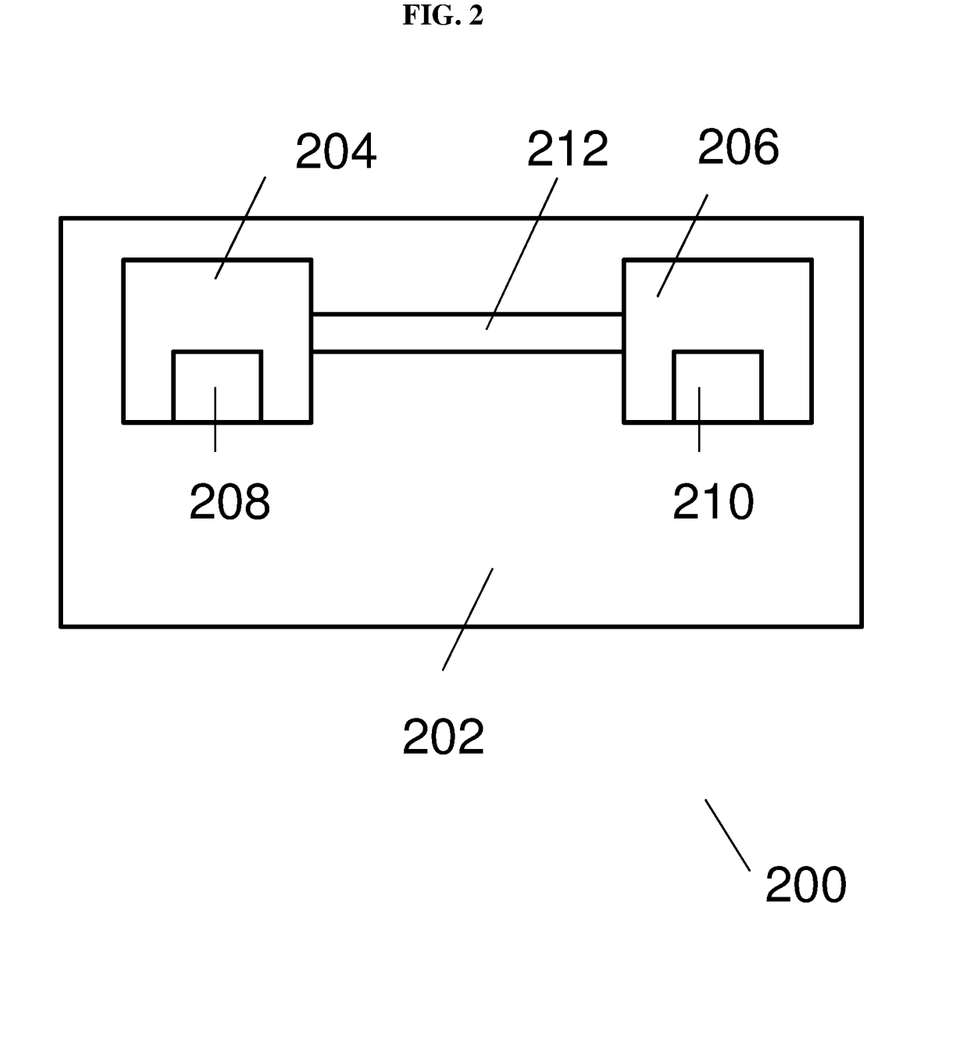
FIG. 2 shows a general illustration of a chemical sensor according to various embodiments.

FIG. 2 shows a general illustration of a chemical sensor 200 according to various embodiments. In the current context, a chemical sensor 200 may be a device that can be used to measure or detect any suitable chemical entity. The chemical sensor 200 may be used to measure or detect a gas. The chemical sensor 200 may, alternatively or additionally, be used to measure or detect a chemical in liquid form. The chemical sensor 200 may be a gas sensor (which may alternatively be referred to as a gas-sensor system).

The chemical sensor 200 may include a substrate 202 including a first sealed (or isolated) cavity 204 and a second sealed (or isolated) cavity 206 separate from the first sealed (or isolated) cavity 204. The chemical sensor 200 may also include an emitter 208 in the first sealed (or isolated) cavity 204, the emitter 208 configured to emit infrared light. The chemical sensor 200 may further include a detector 210 in the second sealed (or isolated) cavity 206. The chemical sensor 200 may also include a waveguide 212 configured to carry the infrared light from the emitter 208 to the detector 210.

The waveguide 212 may include a sensing portion configured such that a property of the infrared light carried through the sensing portion changes in response to a chemical entity in contact with the sensing portion. The detector 210 may be configured to detect the change in the property (of the infrared light).

In other words, the chemical sensor 200 may have two sealed (or isolated) cavities 204, 206. One cavity 204 may house an emitter 208 which emits infrared light and another cavity 206 may house a detector 210. The chemical sensor 200 may also include a waveguide 212 extending between the two cavities 204, 206 to guide the infrared light from the first cavity 204 to the second cavity 206. The waveguide 212 may have a sensing portion in which the infrared light changes in response to a chemical entity coming into contact with the sensing portion. The detector 210 then detects the change in the infrared light to identify or measure the chemical entity.

For avoidance of doubt, FIG. 2 serves to illustrate the various elements of a chemical sensor 200 according to various embodiments, and may not necessarily limit the positions or arrangement of the various elements in relation to one another. For instance, FIG. 2 shows the emitter 208 at the bottom of cavity 204 and the detector 210 at the bottom of cavity 206. However, it may be possible that the emitter 208 is suspended in cavity 204 and detector 210 is suspended in cavity 206. In addition, FIG. 2 does not necessarily limit the size, shape, or orientation of the various elements.

In the current context, a "sealed cavity" may refer to a cavity in which there is no substantial exchange of matter between the cavity and the external environment. For instance, air from the external environment may be prevented from coming into the sealed cavity.

In various embodiments, the sealed cavity may be a vacuum-sealed cavity, i.e. the sealed cavity may contain a vacuum or a partial vacuum. The first sealed cavity 204 may be a vacuum-sealed cavity. The second sealed cavity 206 may be a further vacuum-sealed cavity.

In the current context, an "isolated cavity" may be a cavity in which a device arranged within the cavity is free or has reduced influence from external factors such as thermal noise, environmental temperature changes, chemical erosion and contamination etc.

In various embodiments, the sensing portion may be exposed to allow the chemical to come into contact with the sensing portion.

In various embodiments, the chemical sensor 200 may include a cladding to cover a remaining portion of the waveguide 212.

In various embodiments, the chemical sensor 200 may further include a first grating coupler configured to couple the infrared light from the emitter 208 to the waveguide 212. The chemical sensor 200 may also include a second grating coupler configured to couple the infrared light from the waveguide 212 to the detector 210.

In various embodiments, the chemical sensor 200 may include a first reflector configured to direct the infrared light from the first grating coupler to the waveguide 212. In various embodiments, the chemical sensor 200 may also include a second reflector configured to direct the infrared light from the waveguide 212 to the second grating coupler. The first reflector may be a prism or a mirror. The second reflector may be a prism or a mirror.

In various embodiments, the chemical sensor 200 may be configured to detect multiple chemical entities simultaneously. Various embodiments may involve a demultiplexing process. In various embodiments, the chemical sensor 200 may further include one or more additional waveguides. The waveguide 212 and the one or more additional waveguides may form a plurality of waveguides. One waveguide of the plurality of waveguides may be configured to carry a first predetermined wavelength or a first predetermined range of wavelengths of infrared light, while another waveguide of the plurality of waveguides may be configured to carry a second predetermined wavelength (different from the first predetermined wavelength) or a second predetermined range of wavelengths (different from the second predetermined range of wavelengths) of infrared light.

In various embodiments, the chemical sensor 200 may further include one or more additional detectors. The detector 210 and the one or more additional detectors may form a plurality of detectors, i.e. a detector array. One detector of the plurality of detectors may be configured to detect a first predetermined wavelength or a first predetermined range of wavelengths of infrared light, while another detector of the plurality of detectors may be configured to detect a second predetermined wavelength or a second predetermined range of wavelengths of infrared light.

The first grating coupler maybe configured to separate the infrared light (incident on the first grating coupler) into a plurality of wavelengths or a plurality of predetermined ranges of wavelengths. The plurality of wavelengths or the plurality of predetermined ranges of wavelengths may travel along the plurality of waveguides, each waveguide configured to carry a wavelength or a predetermined range of wavelength. Each wavelength or each predetermined range of wavelength may be detected by a respective detector of the plurality of detectors.

In various embodiments, the emitter 208 may be suspended in the first sealed or isolated cavity 204. In various embodiments, the detector 210 may be suspended in the second sealed or isolated cavity 210.

In various embodiments, the substrate 202 may include a first wafer and a second wafer bonded to the first wafer to form the first sealed cavity 204 and the second sealed cavity 206. The second wafer may include the waveguide 212, or the plurality of waveguides. In various embodiments, the first wafer may be vacuum-bonded to the second wafer.

In various other embodiments, the substrate 202 may include a wafer and an encapsulation layer over the wafer to form the first sealed cavity 204 and the second sealed cavity 206. The encapsulation layer may include the waveguide 212, or the plurality of waveguides.

In various embodiments, the chemical sensor 200 may further include a further detector in the second sealed cavity 206. The chemical sensor 200 may further include a further waveguide configured to carry the infrared light from the emitter to the further detector. The further waveguide is configured to act as a reference, i.e. the further waveguide may be a reference waveguide. The chemical sensor 200 may include a cladding to fully cover the further waveguide.

In various embodiments, the property of the infrared light may be an absorption spectrum of the infrared light. Different chemical entities may absorb different wavelengths of infrared light, and the infrared light that has passed through a chemical entity may have a signature absorption spectrum. Accordingly, the detector 210 may be able to identify a chemical entity by detecting how the absorption spectrum has changed prior and after introduction of the chemical entity to the sensing portion of the waveguide 212.

In various other embodiments, the property of the infrared light may be an intensity of the infrared light. Different chemical entities or different amounts/concentrations of the same chemical entity may absorb different intensities of the infrared light. Accordingly, the detector 210 may be able to identify a chemical entity or determine the amount/concentration of chemical entity by detecting the change in intensity before and after introduction of the chemical entity to the sensing portion of the waveguide 212.

Figure 3:
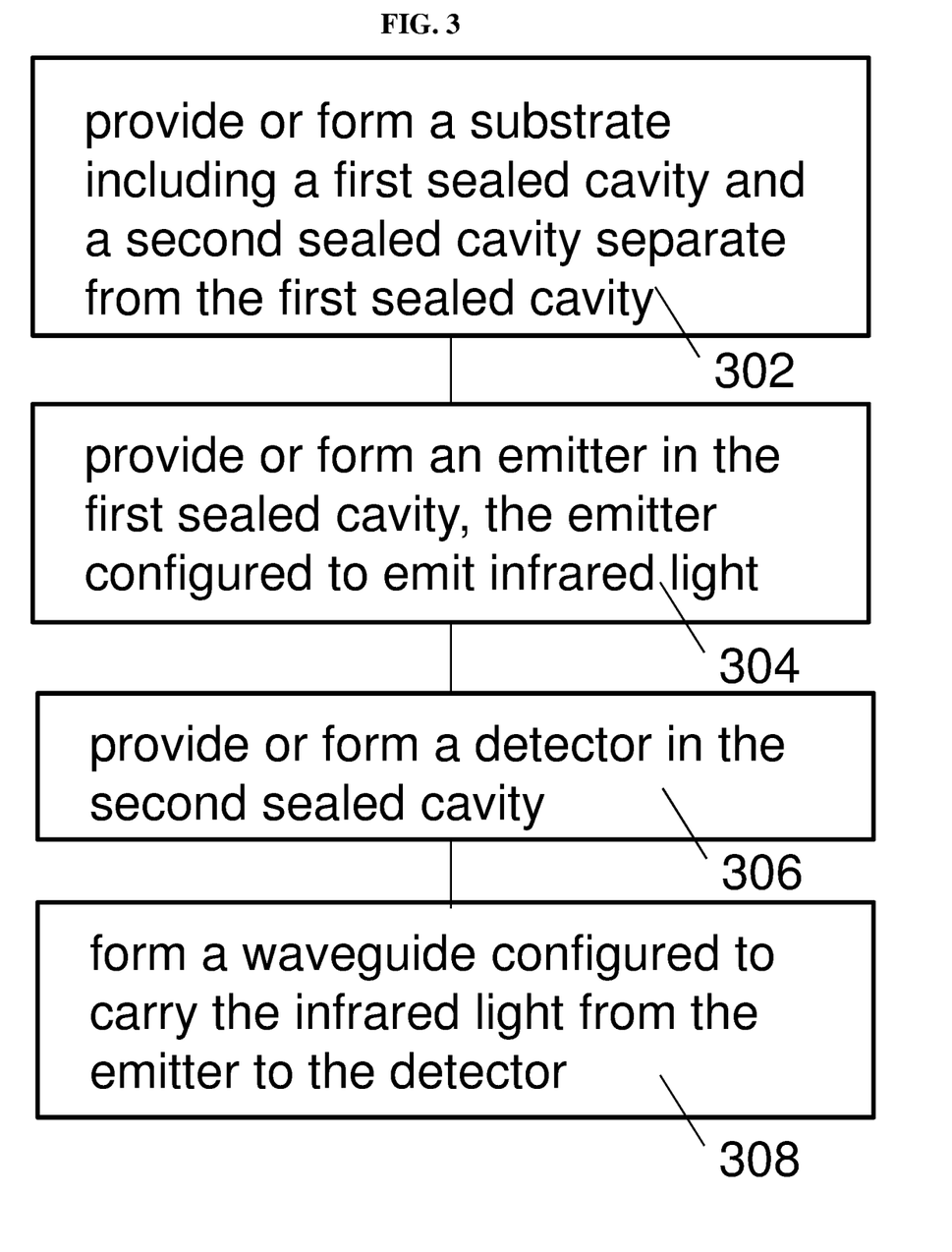
FIG. 3 shows a general illustration of a method of forming a chemical sensor according to various embodiments.

FIG. 3 shows a general illustration of a method of forming a chemical sensor according to various embodiments. The method may include, in 302, providing or forming a substrate including a first sealed or isolated cavity and a second sealed or isolated cavity separate from the first sealed or isolated cavity. The method may also include, in 304, providing or forming an emitter in the first sealed or isolated cavity, the emitter configured to emit infrared light. The method may further include, in 306, providing or forming a detector in the second sealed or isolated cavity. The method may additionally include, in 308, forming a waveguide configured to carry the infrared light from the emitter to the detector. The waveguide may include a sensing portion configured such that a property of the infrared light carried through the sensing portion changes in response to a chemical in contact with the sensing portion. The detector may be configured to detect the change in the property (of the infrared light).

In other words, the method may include arranging the emitter and the detector in separate sealed or isolated cavities. The method may also include fabricating a waveguide to connect the first cavity and the second cavity.

In various embodiments, the substrate may include a first wafer and a second wafer bonded to the first wafer to form the first sealed or isolated cavity and the second sealed or isolated cavity. The first wafer may be vacuum-bonded to the second wafer. The method may include bonding or vacuum bonding the first wafer and the second wafer.

In various embodiments the substrate may include a wafer and an encapsulation layer over the wafer to form the first sealed cavity and the second sealed cavity. The method may include attaching or adhering or molding the encapsulation layer on the wafer. The encapsulation layer may include a waveguide.

Figure 4:
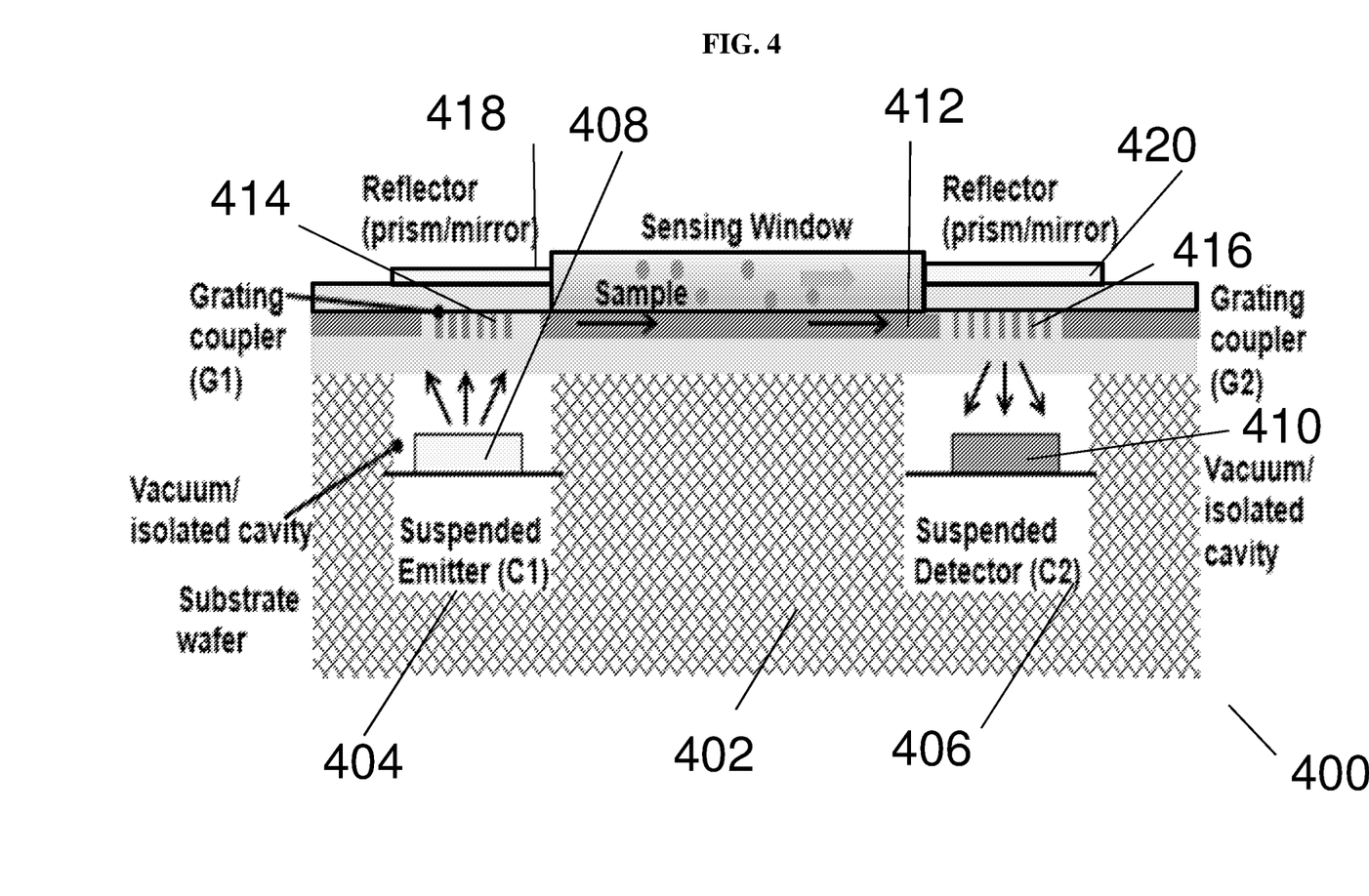
FIG. 4 shows a schematic of a chemical sensor or a gas-sensor system according to various embodiments.

FIG. 4 shows a schematic of a chemical sensor or a gas-sensor system 400 according to various embodiments. The chemical sensor or a gas-sensor system 400 may include a substrate 402 including a first sealed (or isolated) cavity 404 and a second sealed (or isolated) cavity 406 separate from the first sealed (or isolated) cavity 404. The chemical sensor or a gas-sensor system 400 may also include an emitter 408 in the first sealed (or isolated) cavity 404, the emitter 408 configured to emit infrared light. The chemical sensor or a gas-sensor system 400 may further include a detector 410 in the second sealed (or isolated) cavity 406. The chemical sensor or a gas-sensor system 400 may also include one or more sensing elements e.g. waveguides 412 configured to carry the infrared light from the emitter 408 to the detector 410.

The waveguide 412 may include a sensing portion configured such that a property of the infrared light carried through the sensing portion changes in response to a chemical entity in contact with the sensing portion. The detector 410 may be configured to detect the change in the property (of the infrared light).

In addition, the chemical sensor or gas-sensor system 400 may include a first grating coupler 414 configured to couple the infrared light from the emitter 408 to the waveguide 412. The infrared light may be guided by the one or more waveguides 412 to pass through the sensing window to the detector side before being coupled by a second grating coupler 416 to the detector 410. The chemical sensor or gas-sensor system 400 may further include a first reflector 418 configured to work with the first grating coupler 414, and a second reflector 420 configured to work with the second grating coupler 416.

Within the sensing window, the waveguide may be exposed to the chemical entity. Accordingly, there may be interaction between the chemical entity and light. Each component in the gas sensor or system 400 may be fabricated using microelectromechanical system (MEMS) and photonics fabrication technologies.

By sealing the emitter 408 and the detector 410 inside respective isolated cavities 404, 406, the internal interference effects/influence (e.g. temperature, humidity, etc.) on the emitter 408 or the detector 410 may be reduced. Additionally, the emitter 408 and the detector 410 may be shielded or protected from external influence, such as thermal noise, environmental temperature changes, chemical erosion, contamination etc.

Therefore, the isolated sealed cavity arrangement may be critical in improving the stability and reliability of the system 400. In other words, the sealed/isolated cavities 404, 406 may improve the sensitivity and the detection limit of the sensor system 400.

The system 400 may be formed using (1) two-wafer bonding approach, or (2) encapsulation related single wafer approach. Both approaches may be able to provide a wafer-level isolated (including vacuum-sealed) cavity solution for the emitter 408 and the detector 410, and may greatly improve the sensor system stability, while reducing packaging complexity and cost.

Two-Wafer Bonding

Figure 5:
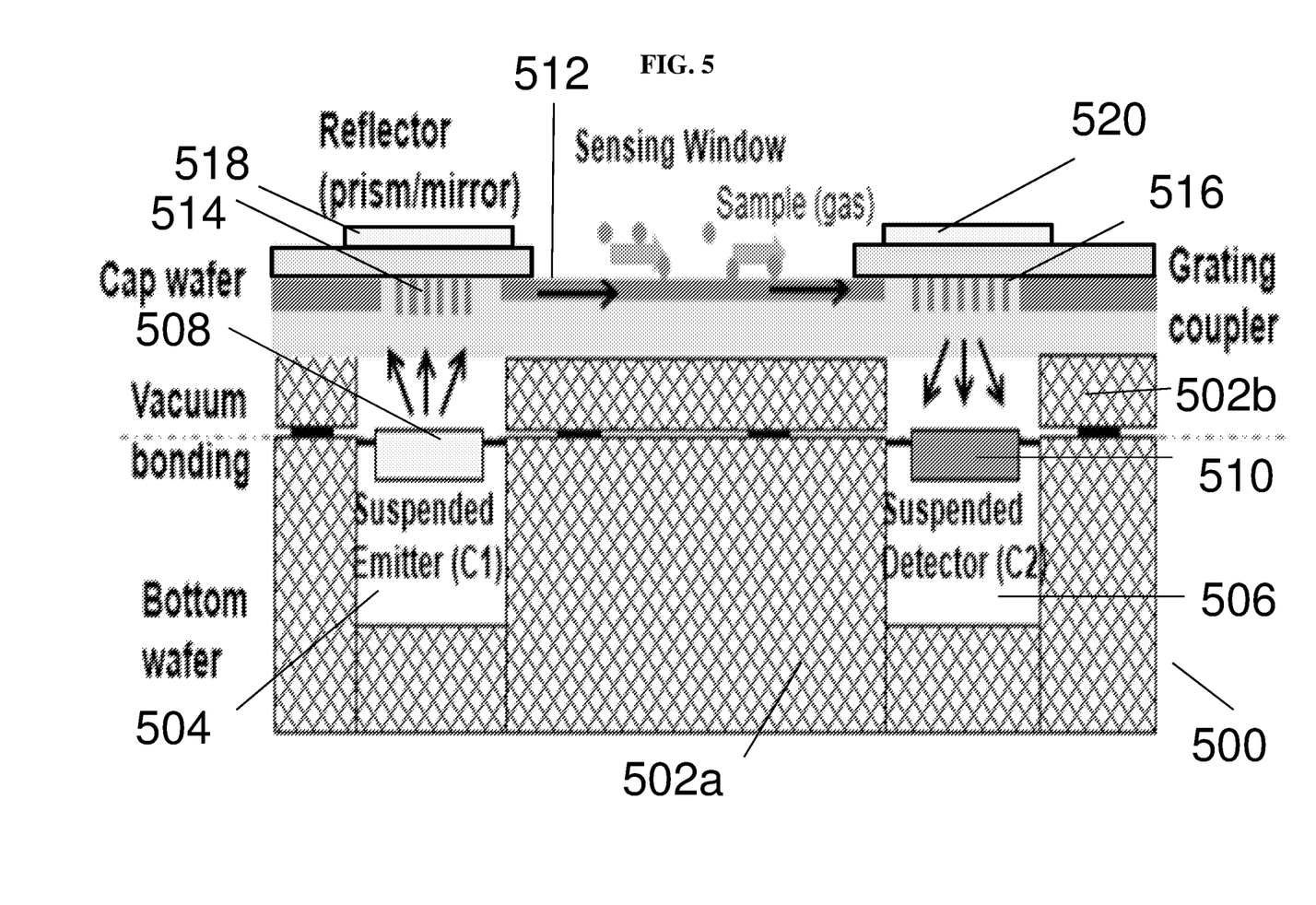
FIG. 5 is a schematic showing a chemical sensor formed using two-wafer bonding according to various embodiments.

FIG. 5 is a schematic showing a chemical sensor 500 formed using two-wafer bonding according to various embodiments. The substrate may include a first wafer 502a vacuum-bonded to the second wafer 502b. The first wafer 502a (alternatively referred to as a bottom wafer) may include an emitter 508 in a first cavity and a detector 510 in a second cavity. The first wafer 502a may be bonded to the second wafer 502b (alternatively referred to as a cap wafer) to form a first vacuum-sealed cavity 504 containing the emitter 508, and a second vacuum-sealed cavity 506 containing the detector 510. As the emitter 508 is within the first cavity 504, and the detector 510 is within the second cavity 506, they may operate with less interference influence. Adhesives such as SU-8, and benzocyclobutene (BCB) may be used in the bonding between the first wafer 502a and the second wafer 502b. In various embodiments, the bonding between the first wafer 502a and the second wafer may be wafer to wafer direct bonding.

The second wafer 502b may include the first grating coupler 514, the second grating coupler 516, the first reflector 518, the second reflector 520, as well as sensing waveguides 512 and reference waveguides (not shown in FIG. 5). The first grating coupler 514, the second grating coupler 516, the first reflector 518, the second reflector 520, sensing waveguides 512, and reference waveguides may be formed using photonics fabrication technologies.

The sensing waveguides 512 may act as an interaction channel for the chemical entity or gas, as well as light.

The first reflector 518 (e.g. a mirror) with a reflective layer facing the first grating coupler 514 may be configured to work with the first grating coupler 514. Similarly, the second reflector 520 (e.g. a mirror) with a reflective layer facing the grating coupler 516 may be configured to work with the second grating coupler 516.

The sensing window (in the sample cell) may be formed using dry-release, and the sensing waveguide 512 may be exposed to the chemical entity, such as a sample gas. The reference cell may be without a sensing window. In the reference cell, the reference waveguides may not be exposed. A layer of cladding (also not shown in FIG. 5) may cover the reference waveguides.

The introduction of the reference cell with the reference waveguides may help compensate influence or interference caused by non-target species.

Encapsulation Related Single Wafer Approach

Figure 6:
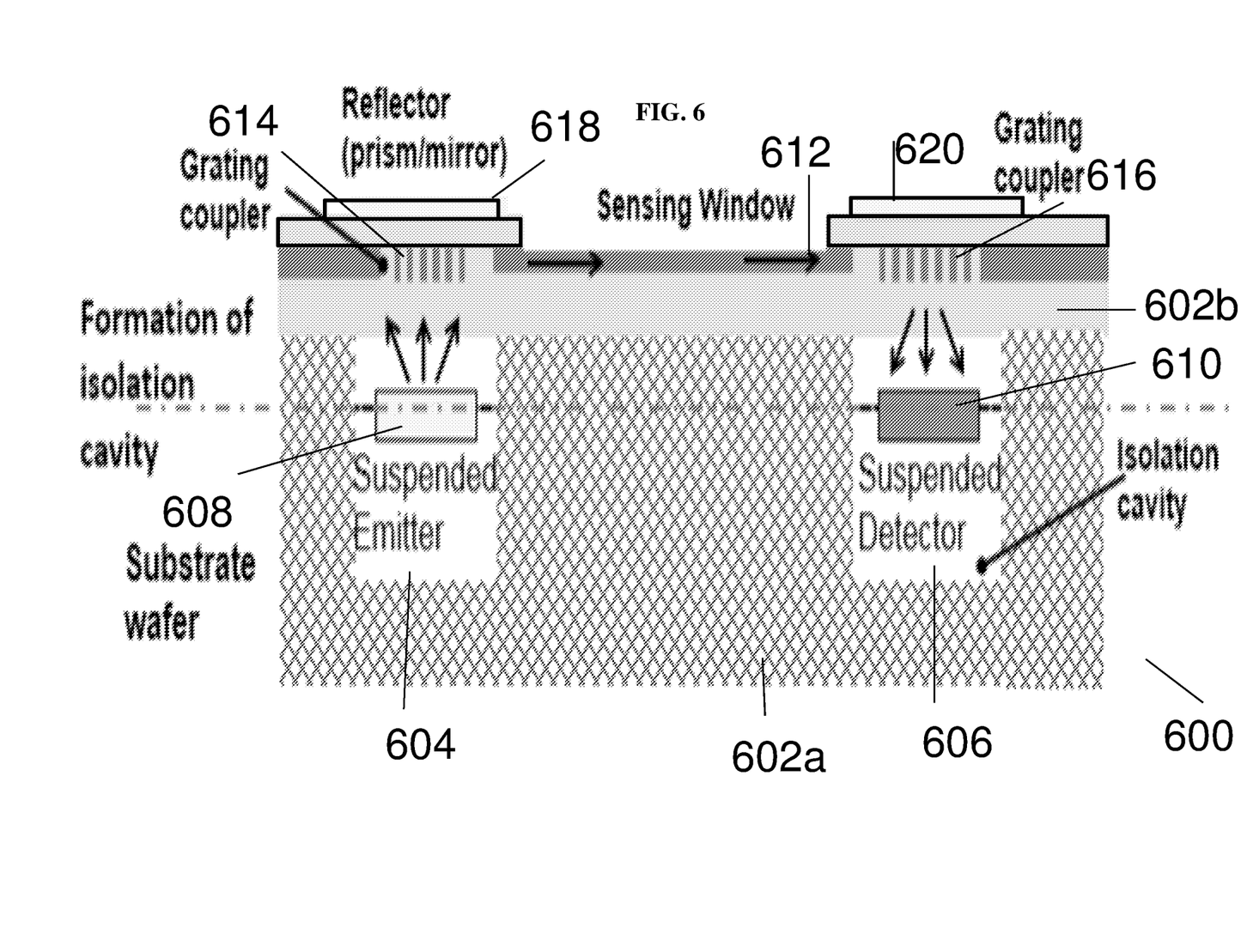
FIG. 6 is a schematic showing a chemical sensor formed using encapsulation related single wafer approach according to various embodiments.

FIG. 6 is a schematic showing a chemical sensor 600 formed using encapsulation related single wafer approach according to various embodiments. In this approach, the emitter 608 may be provided in a first cavity, and the detector 610 may be provided in a second cavity in a substrate wafer 602a. An encapsulation structure or layer 602b may be formed on the substrate wafer 602a. When the encapsulation structure or layer 602b is formed on the substrate wafer 602a, the first cavity may be sealed to form the first vacuum-sealed cavity 604 containing the emitter 608, while the second cavity may be sealed to form the second vacuum-sealed cavity 606 containing the detector 610.

Processes such as film deposition, and etching may be used to form the first grating coupler 614, the second grating coupler 616, the first reflector 618, the second reflector 620, sensing waveguides 612 and reference waveguides (not shown in FIG. 6) on the encapsulation layer or structure 602b. Lithographic alignment for cavities 604, 606 may improve the efficiency of the emitter 608 and/or the detector 610.

In various embodiments, during operation, a light beam emitted from the emitter may be coupled by the first grating coupler (and assisted by the first reflector) onto waveguides, each with a portion defined as a sensing portion (i.e. within a sensing window). The first grating coupler may work with the reflector to demultiplex or sort the emitted light into lights of different wavelengths for different channels. Accordingly, lights of different wavelengths may be carried along different sensing waveguides. As such, the chemical sensor may support simultaneous detection of multiple chemical entities or gases. The chemical sensor may also include a plurality of detectors, thereby forming a detector array. Different detectors may detect lights of different wavelengths. After interaction with different chemical or gas molecules, the lights along the sensing waveguides may be reflected (via a second reflector) and coupled (via a second grating coupler) to the detector array. The first grating coupler may improve light coupling efficiency from the emitter to the detector. The first grating coupler together with the first reflector may act as an optical collimating element, and may also be configured to disperse light into different wavelengths. The second grating coupler (with second reflector) may help direct and couple light to the detector array, thereby improving detector efficiency.

In the chemical or gas sensing system according to various embodiments, two isolated (e.g. vacuum-sealed) cavities may be employed, one cavity for the emitter, and another cavity for the detector. At the detection end, the detector cavity may provide thermal isolation, i.e. reduce or prevent heat conduction from the detector to the surroundings, which may help improve the detection efficiency (i.e. detectivity) as more thermal energy is now directed at the detector.

At the emission end, the emitter cavity may reduce influence of environmental/surrounding factors e.g. temperature, pressure, humidity, etc., on the sensing portion, resulting in higher selectivity and accuracy of the sensing system. Furthermore, such a cavity design may also help reduce the environmental influence of the chemical entity, such as chemical erosion caused by the chemical entity, on the emitter or the detector. Consequently, the cavities may help improve the sensing system life-time, stability, and reliability.

Various embodiments may relate to a miniature wafer-level NDIR chemical/gas sensing system based on MEMS and photonics technologies. Taking advantages of advanced wafer-level bonding, encapsulation techniques, and grating coupler design, the sensing system may achieve a higher light coupling efficiency, as well as better selectivity and sensitivity. The vacuum-sealed cavities (for the emitter and the detector) may not only provide the sensing system with long-term reliability and increased life-time, but may also individually improve the efficiency of the emitter and the detector. Various embodiments may pave the way for on-chip chemical/gas detection, and may be used in broader applications requiring accurate and reliable chemical/gas monitoring, such as in aerospace, agriculture, biology, and indoor-air quality monitoring.

Various embodiments may involve wafer-level integration involving the emitter, the detector, the gas channel, without element assembling process.

Various individual elements may be formed by advanced micromachining and/or photonic technologies.

Various embodiments may have high coupling efficiency achieved through grating couplers (with assistance of the reflectors). Various embodiments may have large tolerance. The high coupling efficiency and large tolerance may enable high sensitivity and sensing resolutions.

In various embodiments, the emitter may work with a grating coupler to achieve light 'demultiplexing' function". The demultiplexed light may be routed to different optical paths.

In various embodiments, each of the emitter and the detector may be arranged in a vacuum-sealed cavity.

In various embodiments, the vacuum cavity may protect or shield the emitter or detector from outside environmental variations, such as temperature, pressure, humidity, etc.

Various embodiments may have high long-term stability and reliability, achieved through vacuum-sealed cavities for the emitter and the detector.

Various embodiments may have less complicated packaging procedure, leading to lower costs.

In various embodiments, the isolation/vacuum cavity may help improve the detector's detectivity and efficiency, due to less thermal loss to the surroundings.

In various embodiments, the isolation/vacuum cavity may protect or shield the emitter and/or the detector from interference of the chemical entity or analyte, e.g. such as from chemical erosion. Only the portion of the waveguides within the sensing window, i.e. the exposed sensing portions, may be exposed to the chemical entity or analyte. The emitter cavity and the detector cavity may be physically isolated from the exposed sensing portions. The sensing waveguides or channels may support light propagation with low optical propagation loss.

In various embodiments, the isolation or vacuum-sealed cavity may protect or shield the emitter and/or the detector from outside environmental variations, including temperature, pressure, humidity etc.

In various embodiments, the isolation or vacuum-sealed cavity may help the emitter and/or the detector achieve long-term stability and reliability.

In various embodiments, the isolation or vacuum-sealed cavities, together with the grating couplers, may enable improved coupling and detection efficiency.

Vacuum-bonding and/or thin-film encapsulation technologies may enable miniaturized wafer-level system integration without sacrificing performance of each element.

Various embodiments may be used in consumer electronics, such as home devices, wearable electronics, mobile phones etc. Various embodiments may be used in in-door or in-cabin air quality monitoring, such as carbon dioxide ($CO_2$) detection. Various embodiments may be used in industrial safety applications such as monitoring of hydrogen sulphide ($H_2S$), carbon monoxide and other hydrocarbon gases. Various embodiments may be used in emission monitoring and control system for the automotive industry. Various embodiments may have environmental related applications, such as monitoring of air quality and/or pollution.

Various embodiments may be used for gas sensing as a measure of Indoor Air Quality (IAQ). Various embodiments may be used in process control in the food industry or the process industry. Various embodiments may be used to detect gas leakage in the chemical process industry or the energy industry.

Advantages of various embodiments may include being miniaturized, high coupling efficiency (achieved using grating couplers and reflectors match designs for emitter and detector), lower noise and high stability (achieved with isolation cavity through packaging technology, e.g. vacuum-sealed, thin-film encapsulation etc), and benefits associated with thermal management due to the vacuum cavities.

In various embodiments, the signal to noise ratio may be improved by employing a reference channel in the chemical or gas detection to reduce the noise induced by the light source. In general, a reference channel may also be helpful in terms of compensation the influence/interference caused by ambient factors, including temperature, other non-target species.

As highlighted above, the isolation cavity, e.g. a vacuum-sealed cavity, may isolate unnecessary environmental noise, e.g. temperature, pressure, humidity etc, and erosion, thereby improving system life-time, stability, reliability and detection accuracy.

In various embodiments, on a chip level, the gas or chemical entity may interact with light more efficiently.

The isolation cavity may lead to improved (detector) detectivity and efficiency due to less thermal distribution into the surroundings.

The temperature compensation design may improve system accuracy.

Various embodiments may improve sensitivity. All operations may be carried out in the waveguide.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A chemical sensor comprising:
a first wafer comprising a first cavity and a second cavity;
a second wafer bonded to the first wafer so that a first sealed cavity is formed by sealing the first cavity, and a second sealed cavity is formed by sealing the second cavity, the second sealed cavity separate from the first sealed cavity;
an emitter in the first sealed cavity, the emitter configured to emit infrared light;
a detector in the second sealed cavity; and
wherein the second wafer comprises a waveguide configured to carry the infrared light from the emitter to the detector;
wherein the second wafer also comprises a first grating coupler configured to couple the infrared light from the emitter to the waveguide, and a second grating coupler configured to couple the infrared light from the waveguide to the detector;
wherein the waveguide comprises a sensing portion configured such that a property of the infrared light carried through the sensing portion changes in response to a chemical entity in contact with the sensing portion; and
wherein the detector is configured to detect the change in the property.

2. The chemical sensor according to claim 1,
wherein the first sealed cavity is a vacuum-sealed cavity; and
wherein the second sealed cavity is a further vacuum-sealed cavity.

3. The chemical sensor according to claim 1,
wherein the sensing portion is exposed to allow the chemical to come into contact with the sensing portion.

4. The chemical sensor according to claim 3, further comprising:
a cladding to cover a remaining portion of the waveguide.

5. The chemical sensor according to claim 1, further comprising:
a first reflector configured to direct the infrared light from the first grating coupler to the waveguide; and
a second reflector configured to direct the infrared light from the waveguide to the second grating coupler.

6. The chemical sensor according to claim 1,
wherein the emitter is suspended in the first sealed cavity; and
wherein the detector is suspended in the second sealed cavity.

7. The chemical sensor according to claim 1,
wherein the first wafer is vacuum-bonded to the second wafer.

8. The chemical sensor according to claim 1, further comprising:
a further detector in the second sealed cavity;
a further waveguide configured to carry the infrared light from the emitter to the further detector;
wherein the further waveguide is configured to act as a reference.

9. The chemical sensor according to claim 8, further comprising:
a cladding to fully cover the further waveguide.

10. A method of forming a chemical sensor, the method comprising:
providing a first wafer comprising a first cavity and a second cavity;
bonding a second wafer to the first wafer so that a first sealed cavity is formed by sealing the first cavity and a second sealed cavity is formed by sealing the second cavity, the second sealed cavity separate from the first sealed cavity;
providing an emitter in the first sealed cavity, the emitter configured to emit infrared light;
providing a detector in the second sealed cavity;
fainting a waveguide in the second wafer, the waveguide configured to carry the infrared light from the emitter to the detector;
forming a first grating coupler in the second wafer, the first grating coupler configured to couple the infrared light from the emitter to the waveguide; and
forming a second grating coupler in the second wafer, the second grating coupler configured to couple the infrared light from the waveguide to the detector;
wherein the waveguide comprises a sensing portion configured such that a property of the infrared light carried through the sensing portion changes in response to a chemical in contact with the sensing portion; and
wherein the detector is configured to detect the change in the property.

11. The method according to claim 10,
wherein the first wafer is vacuum-bonded to the second wafer.

* * * * *